United States Patent Office 2,870,116
Patented Jan. 20, 1959

2,870,116

COATING COMPOSITION COMPRISING A VINYL HALIDE POLYMER AND AN ALDEHYDE-REACTED POLYMER OF ACRYLAMIDE AND METALLIC SURFACE COATED THEREWITH

Henry A. Vogel and Harold G. Bittle, Gibsonia, Pa., assignors to Pittsburgh Plate Glass Company, Allegheny County, Pa., a corporation of Pennsylvania No Drawing. Application January 19, 1956
Serial No. 560,072

10 Claims. (Cl. 260—45.5)

This invention relates to resinous coating compositions having excellent properties, and pertains more specifically to coating compositions containing an aldehyde modified acrylamide interpolymer and a vinyl resin.

In a copending application, Serial No. 490,409, filed February 24, 1955, now abandoned, it is disclosed that useful resinous materials are readily obtained by reacting an aldehyde, particularly formaldehyde, with an interpolymer of acrylamide and one or more polymerizable ethylenically unsaturated monomers. The resulting resins range from soft flexible materials to very hard solids, depending upon the choice of monomers utilized in preparing the acrylamide interpolymer which in turn is reacted with the aldehyde. The resins are useful in coating compositions, giving very rough and mar-resistant films which possess excellent chemical resistance.

It has now been discovered that outstanding coating compositions can be obtained by blending the aldehyde modified amide interpolymers with a vinyl resin. The resulting coating compositions form films with excellent chemical and solvent resistance, and excellent flexibility, toughness and adhesion. The films bake readily to a hard, thermoset state, and are particularly useful to protectively coat aluminum foils such as are used in thermal insulation, for coating collapsible tubes, and for many other purposes.

As stated hereinabove, acrylamide or other polymerizable amide is polymerized with one or more ethylenically unsaturated monomeric compounds, and the resulting interpolymer reacted with an aldehyde to form one resinous component of the coating compositions of this invention. The exact mechanism whereby the amide interpolymers are obtained is not definitely known, but is believed to begin by the formation initially of a relatively short chain soluble interpolymer having an approximate structure as follows, acrylamide being utilized for illustrative purposes:

wherein M represents a unit of a monomer polymerizable with acrylamide, and n represents a whole number greater than 1. For example, if styrene is utilized as the second monomer, M represents the unit

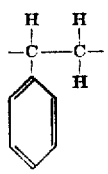

The short chain interpolymer then reacts with an aldehyde, as represented below by formaldehyde, to give the structure:

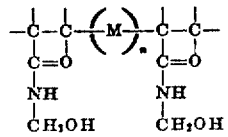

wherein M and n have the significance set forth hereinabove.

In the event the formaldehyde is utilized in the form of a solution in butanol or other alkanol, etherification may take place so that at least some of the methylol groups in the above structure will be converted to groups of the structure —CH$_2$O—Alkyl the alkyl groups being derived from the alkanol utilized. The amount of etherification taking place depends in large measure upon the pH of the reaction medium, with acid conditions favoring etherification. The etherification of the acrylamide interpolymer is believed analogous to the conventional butylation of urea and melamine resins.

Among the monomers which may be polymerized with acrylamide are included methyl acrylate, ethyl acrylate, butyl acrylate, isobutyl acrylate, hexyl acrylate, octyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylate, methacrylamide, dimethylbenzyl methacrylate, durenediol dimethacrylate, and the like. In general, it is preferred that the monomer utilized contain a single CH$_2$=C< group in terminal position, and an especially preferred group of monomers includes methyl acrylate, ethyl acrylate, butyl acrylate, styrene, vinyl toluene, acrylic acid, and monomethyl styrene.

It has been found that preferred acrylamide interpolymers are obtained when at least two monomeric compounds are interpolymerized with the acrylamide. In this manner it is possible to tailor the interpolymer to have any desired degree of hardness or flexibility. For example, one useful ternary interpolymer is prepared from acrylamide, ethyl acrylate, and styrene. Also, a small amount of methyl methacrylate tends to improve the hardness of two component interpolymers, where one of the monomers is of the type which forms soft homopolymers, and a small quantity of an acid monomer such as acrylic acid, methacrylic acid, crotonic acid, maleic acid, or fumaric acid has been found to be particularly useful as an internal catalyst in that it imparts to the coating composition desirable fast curing properties, and obviates, at least on large measure, the need for an external curing catalyst. In place of acrylamide, any other polymerizable amide, for example, methacrylamide or itaconate diamide, may be utilized.

Interpolymers of acrylamide with one or more polymerizable monomers are most readily prepared by carrying out the polymerization in a solvent in which the acrylamide, a white, crystalline solid at room temperature, and the other monomers are soluble, and at reflux temperatures. Butanol has proved to be a satisfactory solvent in most cases. Isopropyl alcohol, butyl cellosolve, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of acrylamide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved as high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions are important in carrying out the polymerization because of the very rapid reaction rate and because the reaction is highly exothermic. Some control of the heat of reaction is obtained by adding the acrylamide to the polymerization mixture incrementally. Good agitation is also desirable.

Another method for preparing acrylamide interpolymers involves utilization of "block" and "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the acrylamide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

Useful resinous materials containing acrylamide are obtained by reacting the interpolymers prepared according to the method described above with an aldehyde. Formaldehyde, in solution in water (formalin) or in a lower alcohol such as butanol, or a formaldehyde yielding substance such as paraformaldehyde, trioxymethylene, or hexamethylenetetraamine, is greatly preferred. However, other aldehydes including acetaldehyde, butyraldehyde, furfural, and the like, preferably containing only atoms of carbon, hydrogen, and oxygen, can be used.

It is preferred that the aldehyde be reacted with an interpolymer containing from about 5 percent to about 45 percent by weight of acrylamide, the balance being the other ethylenically unsaturated monomer(s). It has been found that those interpolymers containing the higher levels of acrylamide with those monomers which ordinarily form hard homopolymers, give hard and flexible films, whereas interpolymers containing lower levels of acrylamide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymer. For example, in some ternary interpolymer systems it may be desirable to utilize about 20 percent by weight of acrylamide, and 40 percent each of two additional monomers such as styrene and butadiene, or in some instances, such as when acrylic acid or some other ethylenically unsaturated acid is utilized as an internal catalyst, it is desirable that the interpolymer contain about 20 percent acrylamide, a total of about 72 percent to 79 percent of two additional ethylenically unsaturated monomers and about 1.0 percent to about 8.0 percent of the unsaturated acid. The amount of monomers necessary in any interpolymerization reaction can readily be determined by simple experiment.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild catalyst such as maleic anhydride. Other acid catalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylenetetraamine, and other basic amines may also be utilized, and, in fact, there is evidence to indicate that the use of the basic catalysts tends to give faster curing resin films.

If desired, the catalyst may be dispensed with entirely, although it is difficult to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. If the aldehyde is not used in the form of an alcoholic solution, it is preferred, although not absolutely necessary, to utilize from about 0.2 percent to 1.0 percent by weight of catalyst, based upon the weight of the acrylamide interpolymer which is reacted with the aldehyde.

The reaction of the acrylamide interpolymer with the aldehyde can be carried out simply by adding the aldehyde and the catalyst (if one is utilized) to the polymerization mixture obtained by polymerizing acrylamide and one or more ethylenically unsaturated monomers and refluxing the resulting mixture for a period of from about 3 to 5 hours until a desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials may also be obtained by first reacting the acrylamide with an aldehyde such as formaldehyde to obtain an alkylol acrylamide, for example, methylol acrylamide, and then polymerizing the methylol acrylamide with one or more of the ethylenically unsaturated monomeric materials disclosed hereinabove. The polymerization utilizing methylol acrylamide is carried out in substantially the same manner as when acrylamide is interpolymerized with one or more monomers.

Regardless of the method by which the resinous material is obtained, the products which are blended with epoxy resins in accordance with this invention will contain in the polymer chain recurrent

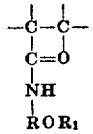

groups, wherein R is a lower aliphatic hydrocarbon radical, that is, the radical derived by removing oxygen from a lower aliphatic aldehyde; for example, if formaldehyde is utilized the radical R represents a methylene group, ($-CH_2-$). When an alcoholic solution of the aldehyde, for example, a butanol solution of formaldehyde is employed, etherification may take place and at least a portion of the alcohol is reacted into the polymer chain so that at least some of the radicals $R_1$ will represent a lower alkyl radical such as butyl, or in other words, a mixture of hydrogen and butyl radicals. When the aldehyde is utilized alone, that is, not in an alcohol solution, the radical $R_1$, of course, will represent hydrogen. The free valences may be satisfied with either hydrogen or hydrocarbon, depending on the amide which is utilized.

The vinyl resins which are combined with the aldehyde modified amide resins to form the compositions of this invention are preferably copolymers of a vinyl halide such as vinyl chloride or vinyl bromide with a vinyl ester of an aliphatic monocarboxylic acid such as vinyl acetate, vinyl propionate, vinyl butyrate, or the like. The aliphatic monocarboxylic acid portion of the vinyl ester molecule should contain no more than 6 carbon atoms (as represented by caproic acid) with vinyl acetate being the preferred ester of this class.

Vinyl resins which are most compatible with the aldehyde modified amide resins are those in which the copolymer of the vinyl halide and the vinyl ester of an aliphatic monocarboxylic acid are modified with a minor proportion of a third component, preferably one which introduces either carboxyl ($-COOH$) or hydroxyl ($-OH$) groups into the polymer structure. Carboxyl groups are readily introduced into the copolymer by the use in the polymerization process of an unsaturated acid or anhydride such as maleic acid (or anhydride) and fumaric acid, and the hydroxyl groups are introduced into the copolymer chain by alkaline hydrolysis of at least a portion of the ester linkages in the copolymer structure.

In the modified copolymer or interpolymer the vinyl halide is the predominant component, ordinarily being present in an amount of about 50 percent to 95 percent by weight, while the ester of an aliphatic monocarboxylic acid is present in an amount of about 2 percent to 45 percent by weight. As indicated hereinabove, the carboxyl or hydroxyl component is present in the minor proportion, ordinarily in an amount of 1 percent to 3 percent by weight, calculated as hydroxyl or carboxyl. One particularly valuable vinyl resin for use in the present invention contains approximately 86 percent vinyl chloride, approximately 12 percent vinyl acetate and approximately 1 percent carboxyl component, normally maleic acid. A preferred hydroxyl modified vinyl resin contains approximately 91 percent vinyl chloride, approximately 3 percent vinyl acetate and approximately 2.3 percent hydroxyl component (approximately 6 percent when calculated as vinyl alcohol). The above vinyl resins are readily available as commercial products, as are other vinyl halide-vinyl ester copolymers modified with either carboxyl or hydroxyl groups.

In addition to copolymers, homopolymers of vinyl halides, such as polyvinyl chloride or polyvinyl bromide may also be blended with aldehyde modified acrylamide resins in accordance with this invention and are to be included within the scope of the term "vinyl resin" as utilized herein.

The following examples are illustrative of the preparation of some polymers of resins containing acrylamide or methacrylamide as a component and which are subsequently treated with formaldehyde:

EXAMPLE A

In this example, an interpolymerizable mixture containing acrylamide was prepared comprising:

Parts by weight
Acrylamide _____ 125
Ethyl acrylate _____ 375
Benzoyl peroxide (catalyst) _____ 7.5
Solvent (butanol) _____ 600

This mixture was refluxed for 6 hours. The resultant solution of a solid content of 46.8 was mixed with 264 parts by weight of a formaldehyde, 3.6 parts by weight maleic anhydride and was refluxed for 2 hours to obtain a product of a solids content of 39.6 percent and a viscosity of $Z_1$. This solution of resin could be incorporated with vinyl resins, such as copolymers of vinyl chloride and vinyl acetate to provide a useful coating composition.

EXAMPLE B

In accordance with this example an interpolymerizable mixture was prepared comprising:

Parts by weight
Acrylamide _____ 62.5
Ethyl acrylate _____ 187.5
Cumene hydroperoxide (catalyst) _____ 2.5
Solvent (butanol) _____ 150

The mixture was refluxed for 1 hour to provide an interpolymer. The resultant solution of interpolymer was mixed with 125 parts by weight of butanol, 132 parts by weight of formaldehyde and 1.7 parts by weight of maleic anhydride. The mixture was refluxed for 20 minutes to provide an interpolymer containing N-methylol groups. The solids content of the product was 36.5 percent and the Gardner viscosity was $Z_2$. This product was suitable for mixing with vinyl resins to provide a highly useful coating material.

EXAMPLE C

In accordance with this example, an interpolymerizable mixture was prepared comprising:

| | Parts by weight |
|---|---|
| Acrylamide | 62.5 |
| Methyl methacrylate | 187.5 |
| Di-tertiary butyl peroxide (catalyst) | 2.5 |
| Solvent (butanol) | 375 |

The mixture was refluxed for 1 hour to provide a solution of a resin product of 40.9 percent solids content and being suitable for subsequent reaction with an aldehyde.

The solution was incorporated wtih 132 parts by weight of formaldehyde and 1.7 parts by weight of maleic anhydride and was heated for 20 minutes to provide a product of a solids content of 37 percent and a Gardner viscosity in a range of $Z_3$ to $Z_6$. This product can be combined with vinyl resins, such as a copolymer of vinyl chloride and vinyl acetate to provide a useful coating composition, the films from which are of high resistance to chemicals and to solvents.

EXAMPLE D

In this example, a mixture was prepared comprising:

| | Parts by weight |
|---|---|
| Acrylamide | 50 |
| Ethyl acrylate | 150 |
| Cumene hydroperoxide | 2 |
| Dodecyl mercaptan | 2 |
| Solvent (butanol) | 200 |

The mixture was refluxed for 4 hours to provide a viscous syrup which was mixed with 106 parts by weight of aqueous formaldehyde and 1.4 parts by weight of maleic anhydride (catalyst); the resulting mixture was refluxed for 1½ hours to provide a product of a viscosity of Z to $Z_1$ at a solids content of 48.5 percent. The product is adapted for blending with vinyl resins to provide an excellent coating material.

EXAMPLE E

In this example, an interpolymerizable mixture was prepared comprising:

| | Parts by weight |
|---|---|
| Methyl acrylamide | 250 |
| Ethyl acrylate | 750 |
| Cumene hydroperoxide | 10 |
| Dodecyl mercaptan | 10 |
| Solvent (butanol) | 1000 |

The foregoing mixture was refluxed for 10 minutes to provide a viscous product which was mixed with 530 parts by weight of formaldehyde and 7 parts by weight of maleic anhydride (catalyst). The mixture was refluxed for 10 minutes to provide a product of 43.8 percent solid and a viscosity of $Z_3$. This product, like those described in the preceding examples, is adapted for incorporation with vinyl resins including copolymers of vinyl chloride and vinyl acetate to provide a useful coating composition.

EXAMPLE F

An interpolymerizable mixture was prepared comprising:

| | Parts by weight |
|---|---|
| Styrene | 40 |
| Ethyl acrylate | 45 |
| Acrylamide | 15 |
| Catalyst (cumene hydroperoxide) | 1 |
| Tertiary dodecyl mercaptan | 1 |

The reaction solvent, as in the preceding example, was butanol. This mixture was refluxed for six hours. The interpolymer product was then incorporated with 2.0 moles of formaldehyde per mole of acrylamide in the form of a 40 percent solution in butanol and the mixture refluxed to provide a product containing N-methylol groups and being suitable for further modification by blending with vinyl chloride-vinyl acetate interpolymers.

The following compositions were prepared:

Composition 1

The interpolymerizable mixture comprised the following reactive components:

| | Parts by weight |
|---|---|
| Styrene | 40 |
| Ethyl acrylate | 45 |
| Acrylamide | 15 |
| Cumene hydroperoxide | 1 |
| Tertiary dodecyl mercaptan | 1 |

Composition 2

The reactive components of this mixture were:

| | Parts by weight |
|---|---|
| Vinyl toluene | 85 |
| Acrylamide | 15 |
| Cumene hydroperoxide | 1 |
| Tertiary dodecyl mercaptan | 1 |

The Compositions 1 and 2 were refluxed for 2 hours and ½ part additional cumene hydroperoxide was added. Refluxing is continued for a further period of 2 hours to give a resinous interpolymer.

A solution comprising 2.0 moles of formaldehyde per mole of amide, of 40 percent concentration in butanol was added and the mixture was catalyzed with about ⅓ part of maleic anhydride in order to adjust the acidity. The mixture was then refluxed for 3 hours, after which the butyl alcohol was distilled to provide a product of 66 percent solids content.

EXAMPLE G

The product of polymerization and aldehyde modification of Composition 1 was thinned with toluene to 50 percent solids and was then ready for blending with a vinyl resin solution.

Other solvents such as xylene or naphtha may be substituted for toluene.

EXAMPLE H

The product of polymerization and treating with formaldehyde of Composition 2 was thinned with toluene to 50 percent solids and could then be blended with vinyl resin solutions as herein disclosed.

EXAMPLE I

Example G was repeated, except that toluene was replaced by aromatic naphtha. The solution was also suitable for blending with solutions of vinyl resins.

EXAMPLE J

The product of polymerization and treating with formaldehyde from Composition 2 was thinned with aromatic naphtha to a solids content of 50 percent. This solution was also suitable for blending with solutions of vinyl resins.

Examples K and L may be grouped together since they involve the use of the same compositions and similar procedures.

EXAMPLE K

The reactive mixture of this example comprised:

| | Parts by weight |
|---|---|
| Styrene | 25 |
| Ethyl acrylate | 60 |
| Acrylamide | 15 |
| Cumene hydroperoxide | 1 |
| Tertiary dodecyl mercaptan | 1 |

The polymerization and treatment with formaldehyde, were conducted substantially as in Example G. However, instead of distilling off butanol at the end of the period of refluxing, with the formaldehyde, the mixture was azeotropically refluxed with butanol for 2 hours to remove water. Finally the butanol was distilled down to a solids content of 50 percent. This solution was suitable for blending with vinyl resin solutions.

EXAMPLE L

The procedure of this example was the same as that of Example K except that butanol was distilled until a solids content of 66 percent was reached. The solution was then thinned to a solids content of 50 percent with aromatic naphtha.

EXAMPLE M

The interpolymerizable composition comprised:

| | Parts by weight |
|---|---|
| Methyl methacrylate | 25 |
| Ethyl acrylate | 60 |
| Acrylamide | 15 |
| Cumene hydroperoxide | 1 |
| Tertiary dodecyl mercaptan | 1 |
| Butyl alcohol | 100 |

The mixture was refluxed for 4 hours to effect interpolymerization.

In order to incorporate the N-methylol group into the interpolymer chain, two moles based upon the acrylamide of formaldehyde as a 40 percent solution in butanol was added and the mixture refluxed for 3 hours. It was then azeotropically refluxed with removal of water for 2 additional hours. Butanol (50 parts by weight) was added and the product distilled to 50 percent solids. It was then ready for use in blending with vinyl resin solutions.

EXAMPLE N

This example was substantially the same as Example M except that distillation of solvents was continued until a solids content of 66 percent was attained. The mixture was thinned to a solids content of 50 percent with aromatic naphtha, and the solution could then be blended with vinyl resins.

EXAMPLE O

Example N was repeated; however, acrylic acid (⅓ part by weight) was added to the interpolymerizable mixture. It reacted by addition with the other monomers in forming the interpolymer. However, the free carboxyls provide the necessary acidity in the interpolymer for reaction with formaldehyde in forming the N-methylol derivative. The maleic acid may be omitted from the interpolymer-formaldehyde mixture if desired.

The following examples illustrate the preparation of useful blends of aldehyde modified acrylamide polymers and vinyl resins.

EXAMPLE I

A pigmented paste was prepared comprising:

| | Parts by weight |
|---|---|
| Titanium dioxide | 155.0 |
| Resin solution as per Example G | 77.7 |
| Xylol | 23.3 |

This paste was used as the paste component in this and subsequent examples. The paste was incorporated with 356 parts by weight of the solution of the reaction product of formaldehyde and the addition polymer prepared as per Example G, and 373 parts by weight of a solution comprising 25 percent by weight of a commercial interpolymer of vinyl chloride and vinyl acetate of the composition:

| | Parts by weight |
|---|---|
| Vinyl chloride | 86 |
| Vinyl acetate | 13 |
| Dicarboxylic acid (maleic acid) | 1 | was added. This resin is sold commercially as Vinylite VMCH.

The solution of vinyl interpolymer was of the composition:

| | Parts by weight |
|---|---|
| Vinyl interpolymer | 197 |
| Methyl isobutyl ketone | 296 |
| Isophorone | 285 |

Other non-reactive solvents could be used.

The blend of the two resin compositions is a useful coating composition which can be spread on metal panels and foils or other material. It can be cured by baking at 300° F–350° F. for 30 minutes.

The films are thermoset, highly adherent, hard, tough, flexible and resistant to chemicals, such as alkalis, acids, salts, mortar, etc., and are resistant to solvents such as alcohol, toluene, methyl isobutyl ketone and the like. They successfully withstand spot tests in contact with swatches of cotton saturated with such materials.

EXAMPLE II

In this example, a paste of a pigment and the resin prepared as per Example G and having the composition of the paste described in Example I was used.

The vinyl resin solution was the same as in Example I. The blend comprised:

| | Parts by weight |
|---|---|
| Pigmented paste (as in Example I) | 256 |
| Resin as per Example G | 232 |
| Vinylite (VMCH) solution | 620 |

The composition contained 50 percent on a solids basis of vinyl resin.

Films of the blend were spread on panels of steel and baked at 300° F. or thereabouts. They were hard, tough, chemically resistant and solvent resistant, and adhered well to the metals such as steel, aluminum, copper, etc.

Various non-reactive pigments may be incorporated in the pastes of the preceding Examples I and II, dependent upon the color, chemical resistance and such like properties desired in the ultimate films.

The solutions of formaldehyde modified interpolymers prepared in accordance with Examples G et seq. may also be blended with vinyl resins such as Vinylite VMCH and others without pigmentation to provide useful clear coating compositions. These may be employed protectively to coat aluminum foils such as are used in thermal insulation and other applications. They may also be used to line containers of sheet steel, aluminum, or conventional pipes. These are only suggestive uses, and innumerable other uses will occur to those skilled in the art where high resistance to chemicals and solvents are desired and/or where good adhesion, hardness and toughness are desirable.

The following are illustrative examples of useful, clear coating compositions:

EXAMPLE III

A solution of the product of reaction between formaldehyde and an acrylamide interpolymer prepared as per Example G in an amount of 150 parts by weight was blended with 100 parts by weight of 25 percent solution of Vinylite VMCH of the composition described in Example I. The blend is useful for clear coating aluminum foil, structural steel parts, steel pipe and many other parts. It may be cured by baking at 300° F. for 30 minutes.

EXAMPLE IV

This example is the same as Example III except that the composition was:

| | Parts by weight |
|---|---|
| Resin solution (as per Example G) | 140 |
| Vinylite VMCH (25 percent solution) | 140 |

EXAMPLE V

This example was also of a clear coating material. The blend comprised:

| | Parts by weight |
|---|---|
| Solution of resin (as per Example G) | 100 |
| Vinylite VMCH (25 percent solution) | 200 |

EXAMPLE VI

The clear blend of this example comprised:

| | Parts by weight |
|---|---|
| Solution of resin (as per Example G) | 50 |
| Vinylite VMCH (25 percent solution) | 300 |

The blends of Examples IV, V and VI may be used to coat aluminum foils or other surfaces and may be baked at about 300° F. in a period of about 30 minutes.

In such applications, the blends may be thinned to a viscosity of about 50 seconds in a #4 Ford Cup. Films of a weight of about 12 milligrams per 14 inches square are quite satisfactory. Thicker or thinner films are also satisfactory.

EXAMPLE VII

Two parts by weight of a polyvinyl chloride plastisol resin and one part by weight of the aldehyde modified resin of Example G were admixed and found to be compatible. Films of the composition were baked for 45 seconds at 400° F. and found to be hard and flexible.

To a second composition consisting of two parts by weight of a polyvinyl chloride plastisol resin and one part by weight of the aldehyde modified acrylamide resin 15 percent by weight of diphenylcresyl phosphate was added. Films of the resulting composition were hard, flexible and exhibited good chemical resistance.

Blends, such as that of Example III, of lower vinyl resin content tend to be of lower viscosity. The films thereof are less flexible than those of higher vinyl resin content. The blends, low in vinyl resin content, are high in viscosity. The baked films therefrom are high in flexibility.

Curing of the films of the blends may be effected at temperatures of about 200° F. to 500° F. in a period of time variable from about 20 or 30 seconds to 2 hours or more, dependent upon the temperature, the hardness desired and like factors.

In Examples III through VI, emphasis has been placed upon the use of acrylamide as the amide component. It is to be understood that this may be replaced by methacrylamide or other polymerizable amides (either with or without methylol condensation).

Vinylite VMCH contains reactive carboxyls (probably of a dicarboxylic acid of low molecular weight) which can react with N-methylol groups in the reaction products of the amid resins to produce linking of the molecules of the two types of resins in the blends through esterification.

Other vinyl resins such as the recognized homopolymers of vinyl halides and copolymers of vinyl chloride and vinyl acetate, even though they do not contain carboxyls, can often be blended with formaldehyde modified acrylamides to provide useful coating compositions. The two types of resin in the blend may assume a monomer relationship with respect to each other, and react by addition of residual terminal ethylenic groups to provide copolymerization of the two resins.

It is also possible and in fact, sometimes desirable to include in the coating compositions of this invention other resinous materials, such as vinyl resins, alkyd resins, amine resins, or the like. Such resins are preferably utilized in minor amounts, although larger quantities may also be employed.

The two types of resins in the blends herein disclosed are mutually compatible with each other. Either resin, even in small amounts can be used with the predominant component (the other resin). Either resin can be used in an amount of about 5 to 95 percent of the resin components. Those blends at or near the extremes of the range tend strongly to resemble the predominant component. The present preference is for blends containing from about 5 to 75 percent by weight of the vinyl resin component.

The forms of the invention as herein given are to be considered as illustrative of the invention. It will be apparent to those skilled in the art that numerous modifications may be made therein without departure from the spirit of the invention or the scope of the appended claims.

We claim:

1. A heat hardenable resinous composition comprising a polymer of a vinyl halide, and an interpolymer of an acrylamide with at least one other monomer having a $CH_2=C<$ group, said interpolymer being characterized by having amido hydrogen atoms replaced by the structure $$—ROR_1$$

wherein R is a saturated lower aliphatic hydrocarbon radical, and $R_1$ is a member of the class consisting of hydrogen and lower alkyl radicals.

2. The heat hardenable resinous composition of claim 1 wherein the polymer of the vinyl halide is a copolymer of vinyl acetate and vinyl chloride.

3. The heat hardenable resinous composition of claim 1 wherein the polymer of a vinyl halide is a polymer of about 50 percent to 95 percent by weight of a vinyl halide, about 2 percent to 45 percent by weight of a vinyl ester of a lower aliphatic monocarboxylic acid containing from 2 to 6 carbon atoms, and about 1 percent to 3 percent by weight of an unsaturated dicarboxylic acid selected from the group consisting of maleic acid, maleic anhydride and fumaric acid.

4. An article having a metallic surface having as a coating thereon a heat hardened film of the resinous composition of claim 1.

5. A heat hardenable resinous composition comprising a polymer of a vinyl halide, and a monoaldehyde-substituted interpolymer of an acrylamide with at least one other monomer containing a single $CH_2=C<$ group, said monoaldehyde containing only atoms of carbon, hydrogen and oxygen.

6. The heat hardenable resinous composition of claim 5 wherein the monoaldehyde is formaldehyde, said formaldehyde having been reacted with said interpolymer in an amount of at least about 0.2 equivalent for each amide group in the interpolymer of acrylamide.

7. An article having a metallic surface having as a coating thereon a heat hardened film of the resinous composition of claim 5.

8. The heat hardenable resinous composition of claim 6 wherein the polymer of a vinyl halide is an interpolymer of a vinyl halide, a vinyl ester of a lower aliphatic monocarboxylic acid containing from 2 to 6 carbon atoms, and an unsaturated dicarboxylic acid selected from the group consisting of maleic acid, maleic anhydride and fumaric acid.

9. A heat hardenable resinous composition comprising an interpolymer of acrylamide, ethyl acrylate and styrene prepared utilizing from about 5 percent to 45 percent by weight of acrylamide, said interpolymer having been reacted with at least about 0.2 equivalent of formaldehyde for each amide group in said acrylamide interpolymer, and an interpolymer of about 50 percent to 95 percent vinyl chloride, about 2 percent to 45 percent of a vinyl ester of a lower aliphatic monocarboxylic acid containing from 2 to 6 carbon atoms, and about 1 percent to 3 percent of an unsaturated dicarboxylic acid selected from the group consisting of maleic acid, maleic anhydride and fumaric acid, said interpolymer of the vinyl halide, vinyl ester and unsaturated dicarboxylic acid being present in an amount of about 5 percent to 75 percent by weight of the resinous components of said coating composition.

10. A heat hardenable resinous composition comprising a polymer of a vinyl halide, and an interpolymer of acrylamide with at least one other monomer having a $CH_2=C<$ group, said interpolymer being characterized by having amido hydrogen atoms replaced by the structure $$-ROR_1$$

wherein R is a saturated lower aliphatic hydrocarbon radical, and $R_1$ is a member of the class consisting of hydrogen and lower alkyl radicals.

References Cited in the file of this patent

UNITED STATES PATENTS

| | | |
|---|---|---|
| 2,132,671 | Bauer | Oct. 11, 1938 |
| 2,680,110 | Loughran et al. | June 1, 1954 |

UNITED STATES PATENT OFFICE
CERTIFICATE OF CORRECTION

Patent No. 2,870,116                                  January 20, 1959

Henry A. Vogel et al.

It is hereby certified that error appears in the printed specification of the above numbered patent requiring correction and that the said Letters Patent should read as corrected below.

Column 4, line 67, after "mild" insert -- acid --.

Signed and sealed this 11th day of August 1959.

(SEAL)
Attest:

KARL H. AXLINE                                    ROBERT C. WATSON
Attesting Officer                                   Commissioner of Patents